Burley

[15] 3,678,741
[45] July 25, 1972

[54] ENGINE COMBUSTION MONITOR
[72] Inventor: Harvey A. Burley, Warren, Mich.
[73] Assignee: General Motors Corporation, Detroit, Mich.
[22] Filed: March 24, 1971
[21] Appl. No.: 127,447

[52] U.S. Cl..............................................73/116, 350/96 B
[51] Int. Cl. ...................................................G01m 15/00
[58] Field of Search....................73/116, 35; 350/96 R, 96 B

[56] References Cited
UNITED STATES PATENTS
3,517,247   6/1970   Szilagyi............................350/96 B X Primary Examiner—Jerry W. Myracle
Attorney—J. L. Carpenter and Robert J. Outland

[57] ABSTRACT

In a preferred embodiment, a combustion monitor for an engine, including a sealed plug for each engine cylinder retaining a quartz viewing window and adapted to receive a fiber optic light transmitting element. Fiber optic elements extend from the sealed plugs of each cylinder to a remotely located viewing panel where they are spacedly arranged in an easily observed position such that the engine operator may observe and compare the intensity and color of light caused by combustion in the various engine cylinders and thereby judge their operating condition. Alternative arrangements for the sealed plug include one version in which cyclic passage of the piston ring over the viewing window surface maintains it free from engine deposits.

2 Claims, 5 Drawing Figures

Patented July 25, 1972 3,678,741

INVENTOR.
Harvey A. Burley
BY
Robert J. Outland
ATTORNEY

3,678,741

ENGINE COMBUSTION MONITOR

FIELD OF THE INVENTION

This invention relates to internal combustion engine condition indicating means and, more particularly, to a combustion monitor through which the engine operator may view at a remote location the intensity and quality of combustion in the various engine cylinders.

SUMMARY OF THE INVENTION

The present invention provides means whereby the driver of a vehicle or the operator of an engine, whether stationary or mobile, may be enabled to observe first-hand the quality and intensity of combustion in the various cylinders of the engine by direct observation of a remote panel.

The invention makes use of known fiber optic light transmitting elements which extend from spaced indicating openings in the remote panel to the various engine cylinders where their ends are respectively received within special pressure sealed viewing plugs. The viewing plugs in each cylinder include a light transmitting element, such as a quartz plug member, which has a surface extending within its respective engine combustion chamber so as to receive and transmit the light caused by the combustion within the chamber to its fiber optic element and thence to the viewing panel. Various constructions for the sealed plug members are provided in order to obtain satisfactory operation under varying conditions.

The invention permits the operator of a vehicle or engine to maintain continuous surveillance of the condition and operation of all the engine's cylinders. In this way, a deterioration of combustion in one cylinder may be observed early enough to permit needed maintenance work to be undertaken before any serious reduction of the engine's operating capabilities results. In addition, the invention will aid both the operator and mechanics who may service the engine to check its condition, as well as the operation of various engine accessories which directly affect combustion in the engine cylinders.

These and other advantages of the invention will be more clearly understood from the following description of preferred embodiments, taken together with the accompanying drawing.

DESCRIPTION OF THE PREFERRED EMBODIMENTS

Figure 1:
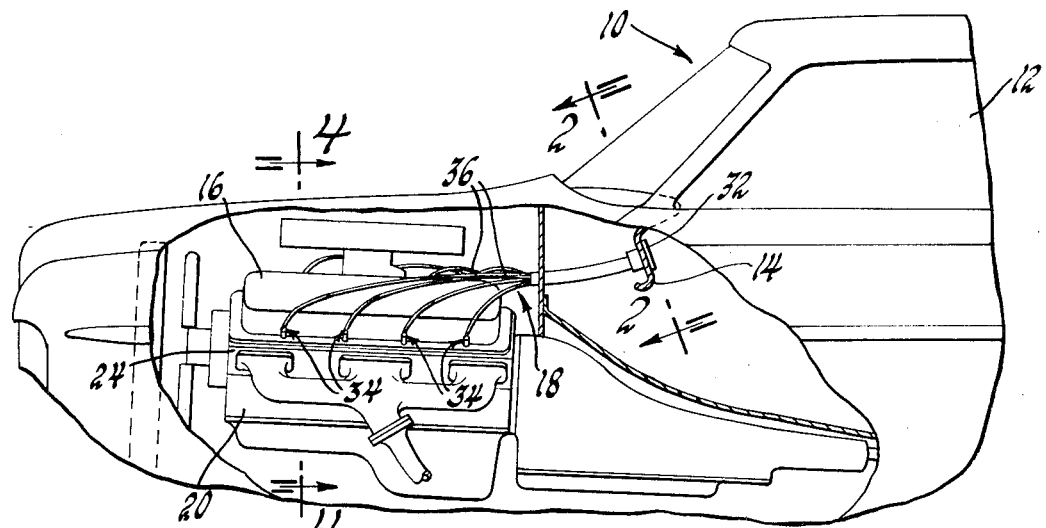
FIG. 1 is a side view of a vehicle partially broken away to show an engine having a combustion monitor formed according to this invention.

Referring now to the drawing in detail, numeral 10 generally indicates an automotive vehicle having a passenger compartment 12 with an instrument panel 14 positioned at the front thereof and in convenient location for observation by the driver of the vehicle. Vehicle 10 is conventionally driven by an internal combustion engine 16 which is provided with a combustion monitor 18 formed in accordance with the present invention.

Engine 16 includes the usual cylinder block 20 incorporating a plurality of cylinders 22 having their upper ends closed by cylinders heads 24. Within each cylinder there is reciprocably disposed a piston 26 which carries first, second and third piston rings 27, 28, 29, respectively, and defines in conjunction with the walls of the cylinder and cylinder head a combustion chamber 30.

The combustion monitor includes a viewing panel 32 which is mounted on the vehicle instrument panel 14; a plurality of viewing plugs 34, one of which is mounted in a wall of each of the engine cylinders; and a plurality of fiber optic light transmitting elements 36, which are arranged to connect the various viewing plugs 34 with the viewing panel 32.

Figure 2:
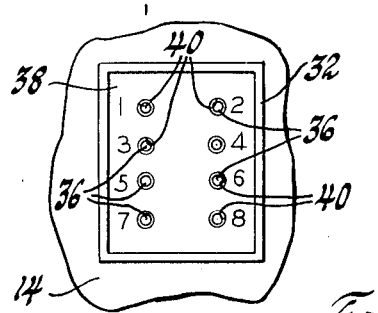
FIG. 2 is a view taken generally in the plane indicated by the line 2—2 of FIG. 1 and showing one possible arrangement of viewing panel in accordance with the invention.
Figure 3:
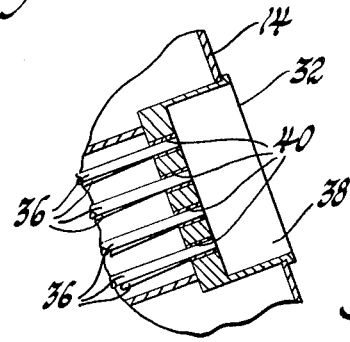
FIG. 3 is a cross sectional view taken generally in the plane indicated by the line 3—3 of FIG. 2 and showing the manner of retention of the fiber optic elements within the viewing panel.

A preferred construction of the viewing panel, as shown in FIGS. 2 and 3, comprises a molded recessed member 38 of rectangular configuration and received within an opening of the instrument panel 14. Member 38 includes in its recessed surface a plurality of spacedly arranged sleeved openings 40 in each of which the end of one of the fiber optic elements 36 is adapted to be received and retained in position such that the ends of members 36 are flush with the inner recessed surface of member 38 and in position to be easily viewable by the driver of the vehicle. The various openings 40 are preferably numbered, as shown in FIG. 2, to indicate the location of the cylinder to which the fiber optic element in each opening is connected.

Figure 4:
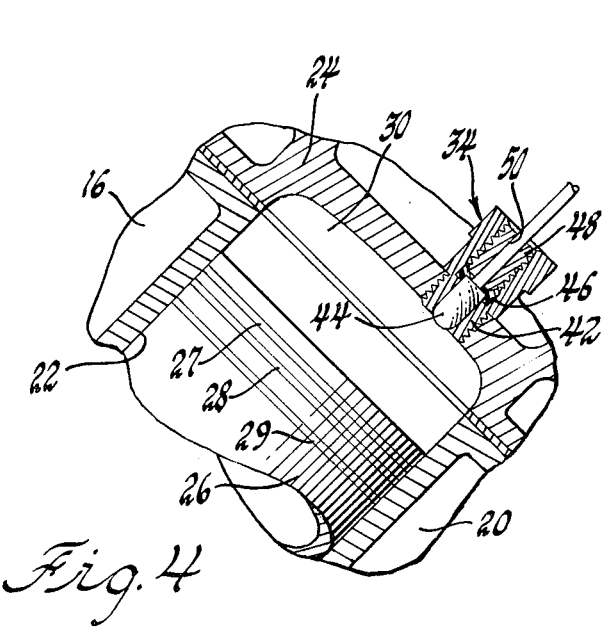
FIG. 4 is a cross sectional view taken generally in the plane indicated by the line 4—4 of FIG. 1 and showing the construction and mounting in the engine cylinder of one embodiment of sealed viewing plug in accordance with the invention.

The construction and mounting of one embodiment of viewing plug is illustrated by FIG. 4. In this arrangement, plug 34 includes a threaded body 42 which is received within a threaded opening provided in the cylinder head 24. The body 42 is hollow and receives internally a quartz insert 44, the inner end of which forms a portion of the surface of combustion chamber 30. The outer end of insert 44 is engaged by an annular seal member 46 which is sealingly maintained in place by a threaded insert 48 having a drilled opening 50 to receive the engine end of its respective fiber optic element 36.

The above described arrangement provides a pressure sealed light transmitting plug which permits the transmission of light through the quartz window to the fiberoptic elements 36 and thence to the viewing panel, where the light created by combustion in the various engine cylinders may be directly viewed by the driver of the vehicle. Preferably, the fiber optic elements 36 are retained within inserts 48 by friction and, if desired, may be pulled from their openings 50 so that the combustion in each cylinder may be directly viewed through the quartz inserts 44 by a mechanic working on the engine.

Experience has shown that during normal operation of a vehicle, the interior surface of the quartz inserts may be expected to remain sufficiently free of engine deposits to permit adequate transmission of the combustion created light therethrough so as to permit normal operation of the combustion monitor over an extended period. However, under operating conditions such as excessively rich mixtures, it is possible that sooty deposits will cover the interior surface and, if this should occur, the viewing plugs 34 may be individually removed to permit cleaning of the interior surface of the quartz inserts 44.

Figure 5:
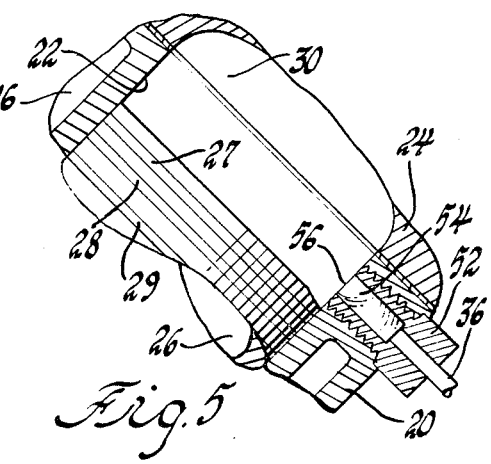
FIG. 5 is a cross sectional view like that of FIG. 4 but showing the construction and mounting in the engine of an alternative embodiment of sealed viewing plug in accordance with the invention.

An alternative embodiment is shown in FIG. 5, in which viewing plugs 52 are threadably engaged in the cylinder block 20 and receive quartz inserts 54, the inner surfaces 56 of which form a portion of the cylinder wall and are located so as to be scraped clean by the movement of the first piston ring 27 thereover as the piston nears its top dead center position. In this arrangement the quartz inserts and fiber optic light transmitting elements are both received directly into close fitting openings in the viewing plugs 52. Sealing of the quartz inserts in this arrangement may be by any suitable means, such as cement, seal elements (not shown) or possibly through a press fit of the components.

It is to be noted that the invention heretofore disclosed is not limited in its application to conventional reciprocating piston engines but may equally well be applied to various types of rotary internal combustion engines. For example, in the socalled "rotary combustion" engines, which are presently in some commercial use and are of considerable interest, viewing plugs of the type shown in FIG. 5 would be especially suitable for mounting in the housing adjacent the combustion zone where the surface of the plug would be swept clean by the rotor seals. It would, however, also be possible to use in such engines viewing plugs of the type disclosed in FIG. 4 if they were suitably recessed in the wall of the housing so as not to be struck by the rotor.

While the invention has been described by reference to certain preferred embodiments, it should be apparent that numerous changes could be made, both in the specific details and application of the invention without departing from the inventive concept as disclosed and claimed.

I claim:

1. A combustion monitor in combination with an internal combustion engine having at least one combustion chamber defined in part by wall means wiped by a combustion seal element, said wall means having an opening to said combustion chamber, said combustion monitor comprising
    a pressure sealed viewing plug sealingly mounted in said wall opening, said viewing plug mounting a light transmitting member having a surface forming a continuation of said wall means and being engageable by said seal element, said viewing plug being arranged to transmit light from combustion within said combustion chamber to points external thereto,
    a viewing panel at a point remote from said engine and convenient for observation by the engine operator, said panel having an opening, and
    at least one fiber optic light transmitting element having one end received by said viewing plug so as to receive light from its light transmitting member and having its other end received in said viewing panel opening and viewable on said panel,
    whereby an operator of said engine may observe the quality of combustion in said combustion chamber by observation of said remote viewing panel.

2. A combustion monitor in combination with an internal combustion engine having a plurality of variable volume combustion chambers respectively defined by closed end cylinders and pistons reciprocably movable in said cylinders, said pistons each having a cylinder engaging gas seal ring disposed annularly therearound adjacent the combustion chamber end thereof, said combustion monitor comprising
    means defining an opening in a wall of each of said cylinders and connecting with said combustion chambers at points reached by the travel of said piston rings near the end of their movement toward the cylinder closed end,
    a pressure sealed viewing plug sealingly mounted in each of said opening defining means, each viewing plug mounting a light transmitting member having a surface forming a continuation of the respective cylinder surface and being engagable by the piston ring of its respective cylinder, said viewing plugs being mounted so as to transmit light from combustion within their respective cylinders to points external thereto when their surfaces are uncovered by the respective pistons,
    a viewing panel at a point remote from said engine and convenient for observation by the engine operator, said panel having a plurality of spaced openings equal to the number of engine cylinders, and
    a plurality of fiber optic light transmitting elements, each element having one end received in one of said viewing plugs so as to receive light from the respective light transmitting member, each said element having its other end received in a respective one of said panel openings with said other end being viewable on said panel,
    whereby said engine operator may observe and compare combustion in the various engine cylinders by observation of said remote viewing panel.

* * * * *